(12) United States Patent
Chanclou

(10) Patent No.: US 11,454,762 B2
(45) Date of Patent: Sep. 27, 2022

(54) AUGMENTED MULTIMODAL SPATIAL OPTICAL-FIBRE MODES

(71) Applicant: ORANGE, Issy-les-Moulineaux (FR)

(72) Inventor: Philippe Chanclou, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 67 days.

(21) Appl. No.: 16/956,139

(22) PCT Filed: Dec. 5, 2018

(86) PCT No.: PCT/FR2018/053123
§ 371 (c)(1),
(2) Date: Jun. 19, 2020

(87) PCT Pub. No.: WO2019/122569
PCT Pub. Date: Jun. 27, 2019

(65) Prior Publication Data
US 2020/0326479 A1 Oct. 15, 2020

(30) Foreign Application Priority Data

Dec. 21, 2017 (FR) ..................................... 1762840

(51) Int. Cl.
*G02B 6/28* (2006.01)
*G02B 6/14* (2006.01)
(Continued)

(52) U.S. Cl.
CPC ....... *G02B 6/2804* (2013.01); *G02B 6/02023* (2013.01); *G02B 6/02042* (2013.01);
(Continued)

(58) Field of Classification Search
CPC .............. G02B 6/2804; G02B 6/02023; G02B 6/02042; G02B 6/14; G02B 6/2808; H04B 10/2581; H04J 14/04
See application file for complete search history.

(56) References Cited

U.S. PATENT DOCUMENTS 8,270,786 B2  9/2012  Westbrook
9,705,630 B2 * 7/2017  Liboiron-Ladouceur ...................
                                                         H04Q 11/0005
(Continued)

FOREIGN PATENT DOCUMENTS

EP    2751942 B1 *  8/2018  ............... G02B 6/26
KR  20170010478 A *  2/2017

OTHER PUBLICATIONS

English translation of the Written Opinion of the International Searching Authority dated Mar. 14, 2019 for corresponding International Application No. PCT/FR2018/053123, filed Dec. 5, 2018.
(Continued)

*Primary Examiner* — Leslie C Pascal
(74) *Attorney, Agent, or Firm* — David D. Brush; Westman, Champlin & Koehler, P.A.

(57) ABSTRACT

A device for inserting a plurality of optical beams into a single-mode optical fibre, a guiding structure of which is composed of a core with a first refractive index, a cladding with a second refractive index, and a coating with a third refractive index. The device includes an optical mixer configured to insert, into the single-mode optical fibre, the plurality of optical beams, at least one of which has a distribution of its radial and angular electromagnetic amplitude with a maximum amplitude peak in the cladding.

12 Claims, 4 Drawing Sheets

(51) Int. Cl.
*G02B 6/02* (2006.01)
*H04B 10/2581* (2013.01)
*H04J 14/04* (2006.01)

(52) U.S. Cl.
CPC ............ *G02B 6/14* (2013.01); *G02B 6/2808* (2013.01); *H04B 10/2581* (2013.01); *H04J 14/04* (2013.01)

(56) References Cited

U.S. PATENT DOCUMENTS

| | | |
|---|---|---|
| 10,200,146 B2 * | 2/2019 | Yin .................... H04B 10/2581 |
| 10,353,148 B2 * | 7/2019 | Zhao .................... G02B 6/3885 |
| 10,666,380 B2 * | 5/2020 | Stern .................. G02B 6/29343 |
| 10,790,905 B2 * | 9/2020 | Mori .................. G02B 6/02023 |
| 2009/0080470 A1 | 3/2009 | Ramachandran et al. |
| 2014/0140694 A1 * | 5/2014 | Zhou ....................... H04J 14/02 398/44 |
| 2014/0186040 A1 | 7/2014 | Fujiwara et al. |
| 2014/0219657 A1 * | 8/2014 | Simonneau ........ H04Q 11/0005 398/49 |
| 2015/0098697 A1 | 4/2015 | Marom et al. |
| 2017/0299900 A1 | 10/2017 | Montoya et al. |

OTHER PUBLICATIONS

International Search Report dated Feb. 21, 2019 for corresponding French Application No. PCT/FR2018/053123, filed Dec. 5, 2018.
Written Opinion of the International Searching Authority dated Feb. 21, 2019 for corresponding French Application No. PCT/FR2018/053123, filed Dec. 5, 2018.

* cited by examiner $LP_{3,1}$ $LP_{0,2}$ $LP_{1,2}$ $LP_{3,2}$

LP$_{0,3}$

LP$_{1,3}$

LP$_{3,3}$

LP$_{6,3}$

AUGMENTED MULTIMODAL SPATIAL OPTICAL-FIBRE MODES

CROSS-REFERENCE TO RELATED APPLICATIONS

This Application is a Section 371 National Stage Application of International Application No. PCT/FR2018/053123, filed Dec. 5, 2018, which is incorporated by reference in its entirety and published as WO 2019/122569 A1 on Jun. 27, 2019, not in English.

1. FIELD OF THE INVENTION

The invention relates to the field of propagation of optical modes through an optical fiber.

2. PRIOR ART

The transmission capacity of optical communication systems using single-mode fibers (SMF) is limited to about 100 Tbit/s because of physical limits on the transmission.

Space division multiplexing (SDM), which is carried out with multicore fibers (MCF) and few-mode fibers (FMF), overcomes this capacity limit of present-day optical communication systems, which are mostly based on SMF. An MCF possesses a plurality of cores. An FMF transmits a plurality of transmission modes in a single core. In both cases, a plurality of propagation modes are transmitted at the same time in parallel in the same fiber, each mode forming one transmission channel.

The major drawback of SDM technology is that it requires the SMF structuring present-day networks to be replaced with MCF or FMF.

One of the aims of the invention is to remedy these drawbacks of the prior art.

3. SUMMARY OF THE INVENTION

The invention aims to improve the situation using a method for injecting a plurality of optical beams into an output optical fiber the guiding structure of which is composed of a core with a first refractive index, of a cladding with a second refractive index, and of a sheath with a third refractive index, wherein at least one of the optical beams has a distribution of its radial and angular electromagnetic amplitude with a maximum amplitude peak in the cladding, the method comprising the following steps:
  obtaining the plurality of optical beams,
  injecting the optical beams by mixing into the output optical fiber.

By using as guiding structure all three of the core, the cladding and the sheath of the output fiber, even though these elements have different refractive indices, the injecting method such as proposed allows a number of optical beams that is higher than in the prior art to be injected into a given output fiber. By modulating these optical beams with the data to be transmitted, it is therefore possible to increase the transmission capacity of a communication system using an optical fiber.

According to one aspect of the injecting method, the output optical fiber is a single-mode fiber, i.e. a so-called SMF, the cladding of which is in a region of the cross section of the fiber that is for example comprised between an inside diameter of about 8 µm and an outside diameter of about 125 µm.

According to one aspect of the injecting method, the output optical fiber is a few-mode fiber, i.e. a so-called FMF, the cladding of which is in a region of the cross section of the fiber that is for example comprised between an inside diameter of about 16 µm and an outside diameter of about 125 µm.

According to one aspect of the injecting method, the output optical fiber is a multimode fiber, i.e. a so-called MCF, the cladding of which is in a region of the cross section of the fiber that is for example comprised between an inside diameter of about 50 µm or about 62.5 µm, and an outside diameter of about 125 µm.

According to one aspect, the injecting method comprises, prior to the step of obtaining the plurality of optical beams, a step of extracting the optical beams from a plurality of optical fibers.

By virtue of this aspect, a plurality of optical communication systems each using one fiber may be combined and mixed into a single output optical fiber. The optical fibers of the systems to be combined may be SMF, FMF or MCF.

According to one aspect of the injecting method, some at least of the extracted optical beams each undergo a conversion in which a respective multimodal spatial mode is applied, prior to the step of injection into the output optical fiber.

By virtue of this aspect, certain of the optical beams combined and mixed into the single output fiber may originate from single-mode optical communication systems. In other words, by virtue of conversions in which a multimodal spatial mode is applied, the advantage of the method is obtained even if a high number of optical beams are initially single-mode.

According to one aspect of the injecting method, the optical fibers from which the optical beams are extracted are single-mode optical fibers.

Thus, a plurality of optical communication systems each using a single-mode fiber may be combined and mixed into a single output fiber. In other words, the advantage of the method is obtained even if all the extracted optical beams are initially single-mode.

According to one aspect of the injecting method, at least one of the optical fibers from which the optical beams are extracted is a multimode or few-mode fiber.

By virtue of this aspect, certain of the optical beams combined and mixed into the single output fiber may originate from multimode or few-mode optical communication systems. Thus, it is possible to accept input-side MCF or FMF the beams of which are already multimodal and do not require a conversion in which a multimodal spatial mode is applied.

In other words, the advantage of the injecting method is also obtained if all the optical beams, or if only some of the extracted optical beams, are initially multimode or few-mode.

According to one aspect of the injecting method, the output optical fiber is a single-mode optical fiber, a few-mode optical fiber, or a multimode optical fiber.

Thus, the proposed injecting method is applicable to any existing optical communication system based on an optical fiber.

The various aspects of the injecting method that have just been described may be implemented independently of one another or in combination with one another.

The invention also relates to a device for injecting a plurality of optical beams into an output optical fiber the guiding structure of which is composed of a core with a first refractive index, of a cladding with a second refractive index, and of a sheath with a third refractive index, the device comprising an optical mixer configured to inject into the output optical fiber the plurality of optical beams, at least one of which has a distribution of its radial and angular electromagnetic amplitude with a maximum amplitude peak in the cladding.

According to one aspect of the injecting device, the injecting device furthermore comprises:
- a plurality of optical receivers configured to receive optical beams from a plurality of optical fibers, upstream of the optical mixer,
- at least one spatial-mode converter configured to modify the distribution of the radial and angular electromagnetic amplitude of an optical beam, between one of the optical receivers and the optical mixer.

According to one aspect of the injecting device, the output optical fiber is a single-mode fiber.

According to one aspect of the injecting device, the output optical fiber is a few-mode fiber.

According to one aspect of the injecting device, the output optical fiber is a multimode fiber.

This injecting device, all the embodiments of which are able to implement the injecting method that has just been described, is intended to be implemented in a fiber-optic transmitting equipment.

4. PRESENTATION OF THE FIGURES

Other advantages and features of the invention will become more clearly apparent on reading the following description of one particular embodiment of the invention, which embodiment is given simply by way of non-limiting, illustrative example, and the appended drawings, in which.

5. DETAILED DESCRIPTION OF AT LEAST ONE EMBODIMENT OF THE INVENTION

In the rest of the description, examples of a plurality of embodiments of the invention based on a single-mode output optical fiber are presented, but the invention is also applicable to other types of output optical fiber, such as few-mode fibers or multimode fibers.

The principle of the proposed method and device is to reuse the structure of the output fiber to propagate more modes than in the prior art, each mode forming a distinct transmission channel. To this end, and going against the prejudices of those skilled in the art, the assembly composed of the core, of the cladding and of the sheath of the output fiber is used as guiding structure.

Figure 1:
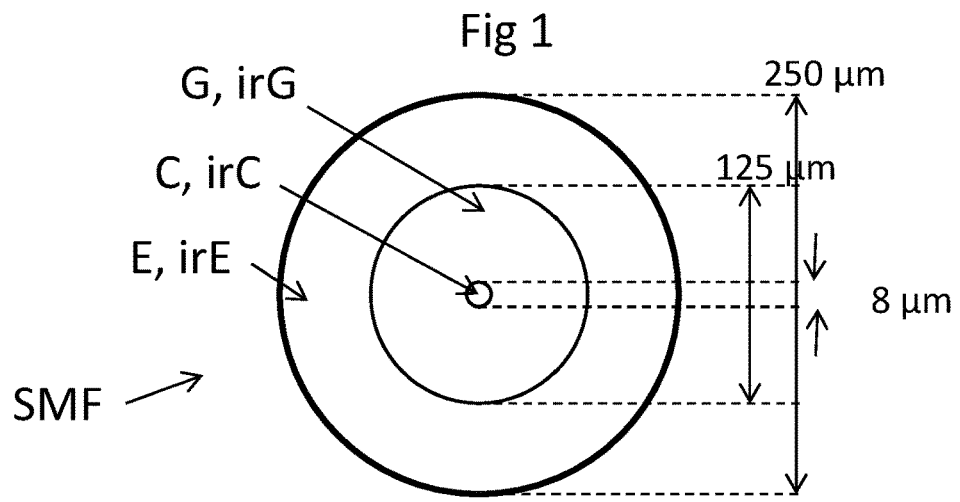
FIG. 1 shows a cross-sectional view of an example of a single-mode fiber used as light-guiding structure by the method according to the invention.
Figure 1:
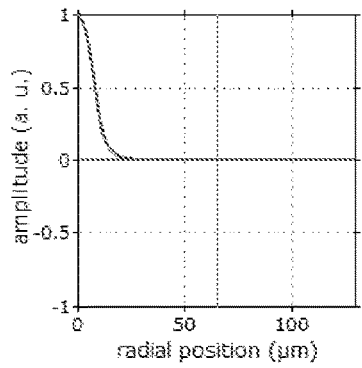

FIG. 1 shows a cross-sectional view of an example of a single-mode fiber used as light-guiding structure by the method according to the invention.

The SMF structure is circular with:
- a core C of about 8 µm diameter with a glass of refractive index irC of about 1.442 at 1300 nm
- a cladding G of 125 µm diameter with a glass of refractive index irG of about 1.440 at 1300 nm
- a sheath E of 250 µm diameter with a polymer of refractive index irE between 1.25 and 1.55 at 980 nm.

The principle is therefore to use the two glass structures, namely the core and the cladding, as the new multimodal guiding core. The sheath now plays a role as new cladding for at least certain of the spatial modes.

FIGS. 2a to 2k illustrate, for various spatial modes, two-dimensional distributions of the intensity of the optical signal over the cross section of the SMF, as a function of a radial and angular electromagnetic amplitude.

These distributions were obtained by mathematical simulation, for a guiding structure with dimensions and refractive indices such as described with reference to FIG. 1, but other dimensions and refractive indices are envisionable.

For each of FIGS. 2a to 2k, the graph on the left-hand side shows the radial distribution of the light, in other words its amplitude as a function of distance from the center of the fiber. The image on the right-hand side shows the resulting distribution of light in a two-dimensional cross section of the optical SMF. The angular distribution is the number of "spots" per ring; this may be seen in the image on the right-hand side and is not shown in a graph.

Figure 2A:
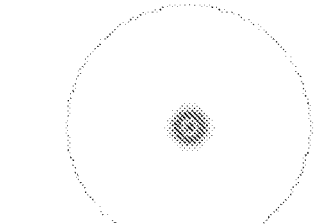
FIGS. 2a to 2k illustrate, for various spatial modes, two-dimensional distributions of the intensity of the optical signal over the cross section of the single-mode fiber, as a function of a radial and angular electromagnetic amplitude.
Figure 2A:
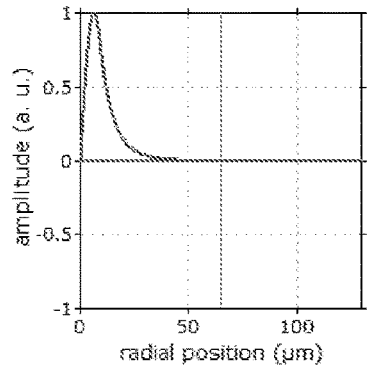

The first propagation mode, which is illustrated in FIG. 2a, is the natural propagation mode of the single-mode fiber, i.e. the mode named $LP_{0,1}$, the intensity peak of which is concentrated in the core of the fiber.

Figure 2B:
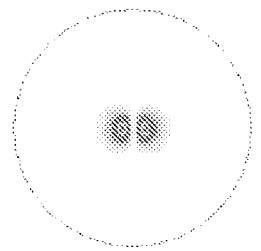
Figure 2B:
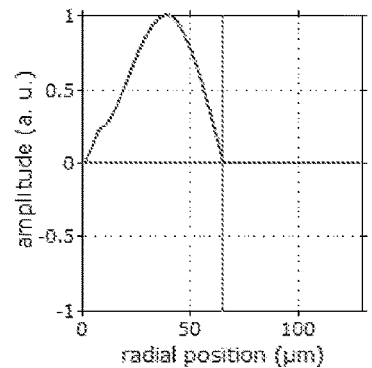

FIG. 2b illustrates the $LP_{1,1}$ mode, in which 2 maximum peaks in light intensity are present in the cladding, on either side of the core.

Figure 2C:
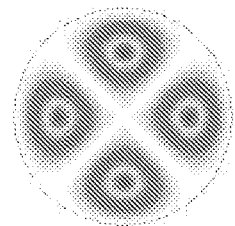

FIG. 2c illustrates the $LP_{2,1}$ mode, in which 4 maximum peaks in light intensity are present in the cladding, on either side of the core.

Figure 2D:
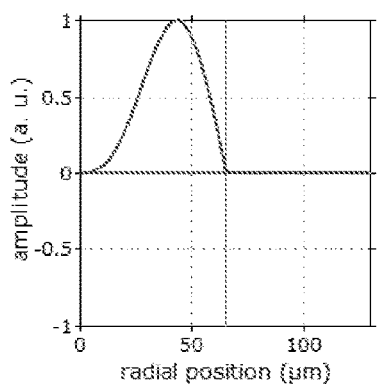
Figure 2D:
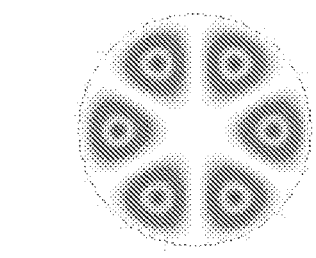

FIG. 2d illustrates the $LP_{3,1}$ mode, in which 6 maximum peaks in light intensity are present in the cladding, on either side of the core.

Figure 2E:
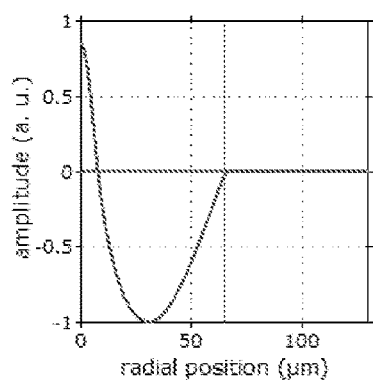
Figure 2E:
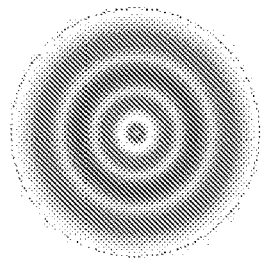

FIG. 2e illustrates the $LP_{0,2}$ mode, in which 2 maximum peaks in light intensity are present in the cladding, in the form of 2 rings around the core.

Figure 2F:
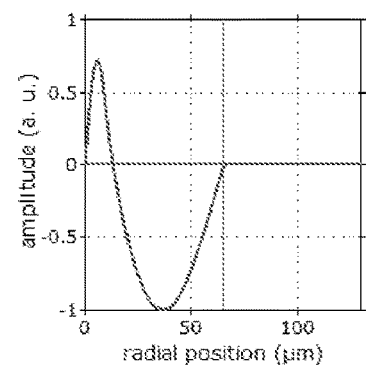
Figure 2F:
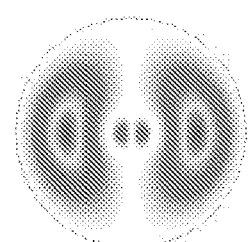

FIG. 2f illustrates the $LP_{1,2}$ mode, in which 2 times 2 maximum peaks in light intensity are present in the cladding, on either side of the core.

Figure 2G:
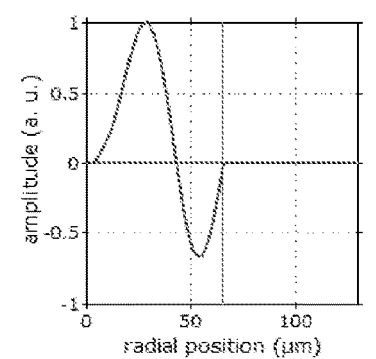
Figure 2G:
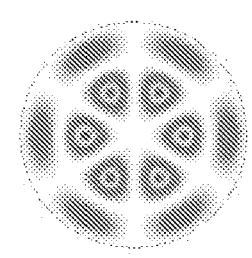

FIG. 2g illustrates the $LP_{3,2}$ mode, in which 2 times 6 maximum peaks in light intensity are present in the cladding, distributed in 2 rings around the core.

Figure 2H:
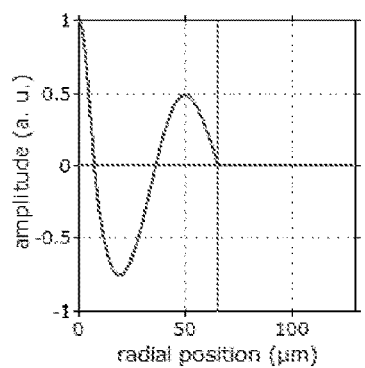
Figure 2H:
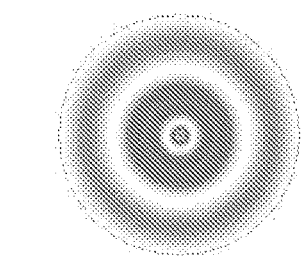

FIG. 2h illustrates the $LP_{0,3}$ mode, in which 3 maximum peaks in light intensity are present in the cladding, in the form of 3 rings around the core.

Figure 2I:
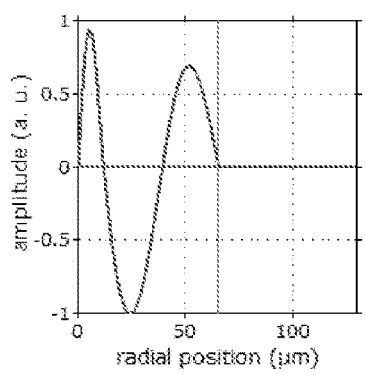
Figure 2I:
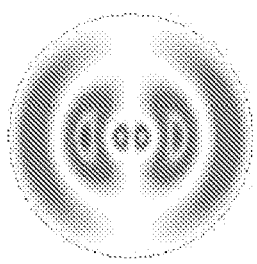

FIG. 2i illustrates the $LP_{1,3}$ mode, in which 3 times 2 maximum peaks in light intensity are present in the cladding, on either side of the core.

Figure 2J:
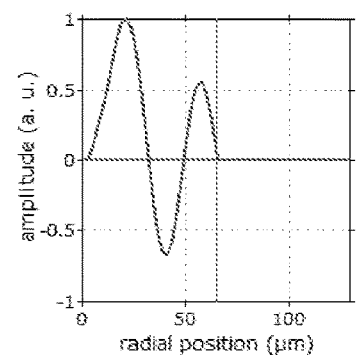
Figure 2J:
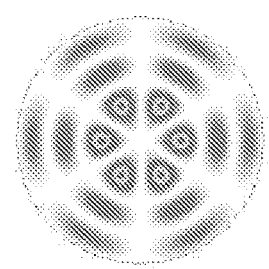

FIG. 2j illustrates the $LP_{3,3}$ mode, in which 3 times 6 maximum peaks in light intensity are present in the cladding, distributed in 3 rings around the core.

Figure 2K:
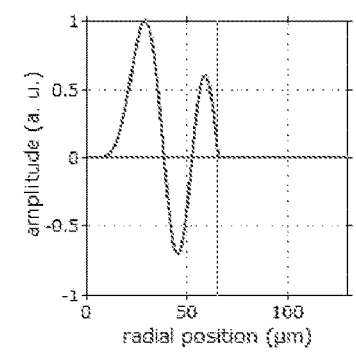
Figure 2K:
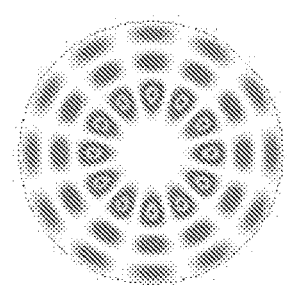

FIG. 2k illustrates the $LP_{6,3}$ mode, in which "times 12 maximum peaks in light intensity are present in the cladding, distributed in 3 rings around the core.

It may therefore be seen that the guiding structure according to the invention is highly multimode, with, for each mode, specific propagation characteristics. The table below collates these characteristics for the $LP_{x,y}$ modes of FIGS. 2a to 2d, giving their propagation constant (beta), their effective index ($n_{eff}$) for a wavelength of 1310 nm, their effective area ($A_{eff}$), and their cut-off wavelength (lambda):

| x | y | beta | $n_{eff}$ | $A_{eff}$ | lambda |
|---|---|---|---|---|---|
| 0 | 1 | 5.84237/μm | 1.441254 | 268.5 μm² | |
| 1 | 1 | 5.83836/μm | 1.440265 | 386.3 μm² | 79355.21 nm |
| 2 | 1 | 5.83676/μm | 1.439871 | 5941.8 μm² | 50125.58 nm |
| 3 | 1 | 5.83647/μm | 1.439800 | 5698.0 μm² | 37400.37 nm |

Figure 3:
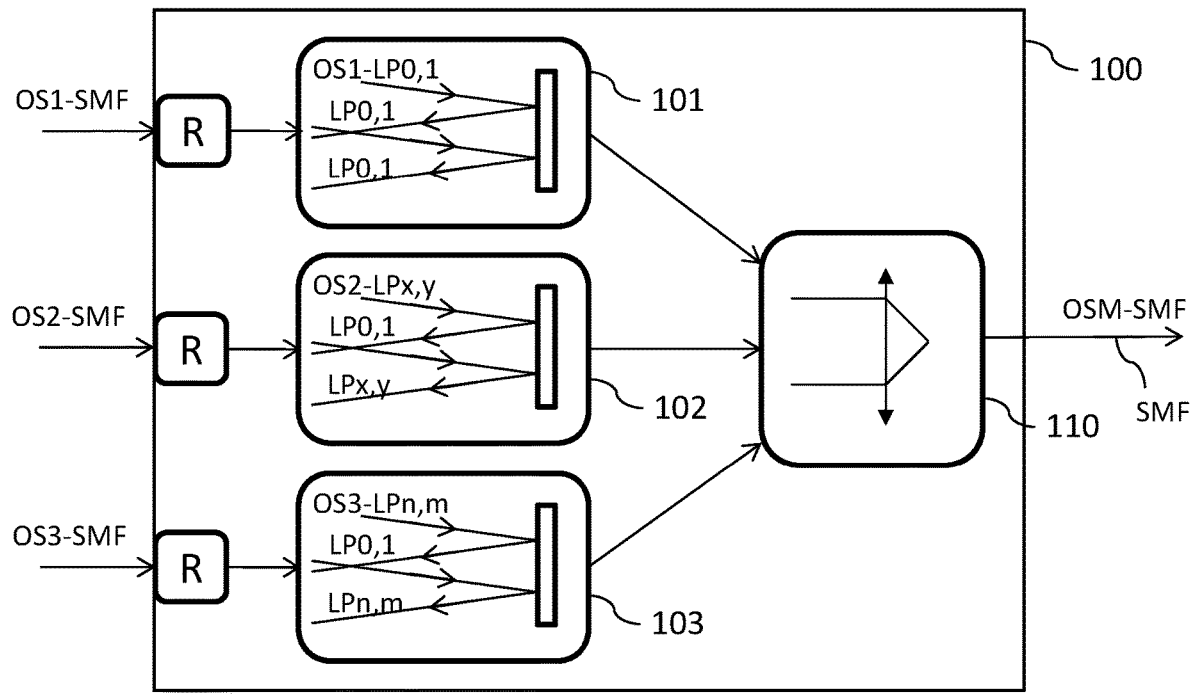
FIG. 3 shows one example of a device for injecting a plurality of optical beams into a single-mode optical fiber, according to one aspect of the invention.

FIG. 3 shows an example of a device for injecting a plurality of optical beams into a single-mode optical fiber, according to one aspect of the invention.

The device 100 comprises, at least, a mixer 110 that accepts as input a plurality of optical beams, and produces as output a resulting optical beam OSM-SMF that is injected into an output single-mode optical fiber. One particularity of the mixer is that at least one optical beam received as input is multimodal, i.e. at least one of these optical beams has a distribution of its radial and angular electromagnetic amplitude with a maximum amplitude peak that is positioned in the cladding of the output optical SMF, and not in the core thereof.

The mixer 110 mixes the optical beams received as input without modifying their spatial distribution and injects the optical beam OSM-SMF resulting from the mixing into the optical SMF.

The device 100 may consist of just the mixer 110, but, advantageously, it may also comprise optical receivers R and light-profile converters 101, 102, 103.

Optical beams OS1-SMF, OS2-SMF, OS3-SMF are for example obtained by the optical receivers R from single-mode fibers.

The light-profile converters are optical components configured to modify the radial and angular distribution of an optical beam, which respectively receive one of the extracted optical beams OS1-SMF, OS2-SMF, OS3-SMF with a view to respectively converting them into the beams OS1-LP0,1, OS2-LPx,y, 053-LPn,m. Such converters 101, 102, 103 are known and are for example multi-plane light converters (MPLC), which are based on a modification of optical phase.

An MPLC converts a single-mode input beam, i.e. a beam the energy of which is concentrated at the center of the optical medium, into a multi-mode output beam, the energy of which is distributed between a plurality of locations in the optical medium. Each distribution is characterized by a radial and angular amplitude denoted $LP_{x,y}$, such as those illustrated in FIGS. 2b to 2k, where x indicates the number of separate energy peaks in a semicircle around the center, and y indicates the number of rings containing energy peaks.

Figure 4:
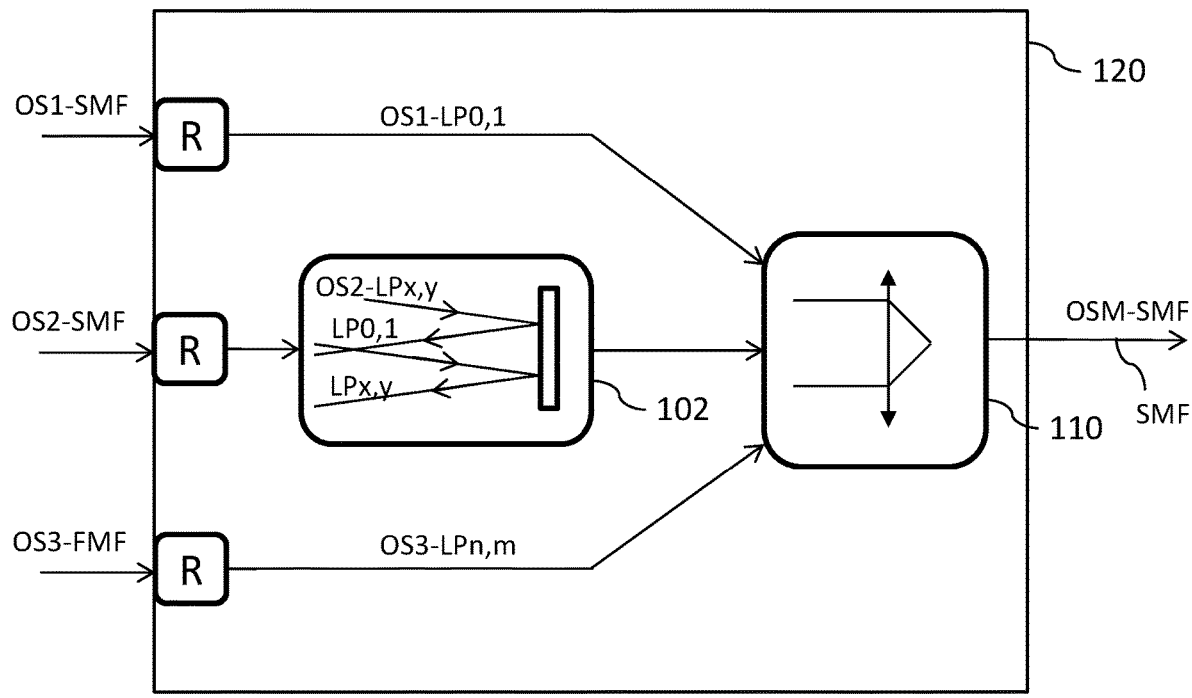
FIG. 4 shows another example of a device for injecting a plurality of optical beams into a single-mode optical fiber, according to one aspect of the invention.

FIG. 4 shows an example of a device for injecting a plurality of optical beams into a single-mode optical fiber, according to another aspect of the invention.

The device 120 differs from the device 100 in that it may deliver, to the mixer 110, certain beams, such as for example the beam OS1-SMF and the beam OS3-FMF, without modifying them with respect to their state on input into the device, and certain other beams, such as for example the beam OS2-SMF converted into the beam OS2-LPx,y, after having converted them.

The beam OS1-SMF is received by a receiver R in the device, from a (single-mode) SMF, and is already in an $LP_{0,1}$ spatial mode. This beam is therefore delivered without conversion to the mixer 110.

The beam OS3-FMF is received by a receiver R in the device from a (few-mode) FMF, and is already in an $LP_{n,m}$ spatial mode. This beam is therefore delivered without conversion to the mixer 110.

It will be understood that many configurations are envisionable for the device 120. It may accept as input either solely SMF, as the device 100, or indeed any combination of SMF, FMF and MCF.

The examples of devices illustrated in FIGS. 3 and 4 are based on delivery of 3 optical beams to the mixer as input, but any number of input optical beams, whether higher or lower than 3, are envisionable.

Likewise, the injecting device according to the invention may employ a single MCF that delivers a plurality of input beams, for example single-mode and/or multi-mode beams, or a combination of these 2 types of beams, that the mixer 110 injects, optionally after conversion, into an SMF.

By virtue of the injecting device 100 or 120 according to the invention, the number of data-transmission channels that the output SMF is able to transport is equal to the sum of the modes present in the beams converted, or provided as input for beams that are already multimodal. The data to be transmitted modulate one or more wavelengths with different polarizations of an optical beam. All of these beams therefore form a multi-mode transmission channel composed of "n" beams and "l" wavelengths in "p" polarization states. The components used to perform this optoelectronic modulation are for example external Mach-Zehnder modulators or directly modulated laser sources.

The output optical SMF used by way of example in the figures may be replaced by a few-mode fiber (FMF) or by a multimode fiber (MCF). By virtue of the invention, it is therefore possible to increase the transmission capacity of an optical fiber instead of replacing it, whether it be an SMF, FMF or MCF.

The invention claimed is:

1. An injecting method comprising:
   injecting a plurality of optical beams into an output optical fiber, which has a guiding structure composed of a core with a first refractive index, a cladding with a second refractive index, and a sheath with a third refractive index, wherein the injecting comprises:
   obtaining the plurality of optical beams, and
   injecting the plurality optical beams by mixing the plurality of optical beams into the output optical fiber, wherein the core and the cladding play a role of a multimodal guiding core, and the sheath plays a role as cladding for the output optical fiber for at least certain spatial modes, and wherein at least one of the optical beams undergoes a conversion in which a respective multimodal spatial mode is applied prior to the injection into the output optical fiber, generating for the respective optical beam a distribution of its radial and angular electromagnetic amplitude with a maximum amplitude peak in the cladding of the output fiber.

2. The injecting method as claimed in claim 1, comprising, prior to the obtaining of the plurality of optical beams, extracting the optical beams from a plurality of optical fibers.

3. The injecting method as claimed in claim 2, wherein the optical fibers from which the optical beams which are extracted are single-mode optical fibers.

4. The injecting method as claimed in claim 2, wherein at least one of the optical fibers from which the optical beams are extracted is a few-mode fiber.

5. The injecting method as claimed in either claim 2, wherein at least one of the optical fibers from which the optical beams are extracted is a multimode fiber.

6. The injecting method as claimed in claim 1, wherein the output optical fiber is a single-mode fiber.

7. The injecting method as claimed in claim 1, wherein the output optical fiber is a few-mode fiber.

8. The injecting method as claimed in claim 1, wherein the output optical fiber is a multimode fiber.

9. A device for injecting a plurality of optical beams into an output optical fiber, which has a guiding structure composed of a core with a first refractive index, a cladding with a second refractive index, and a sheath with a third refractive index, the device comprising:
- an optical mixer configured to inject into the output optical fiber the plurality of optical beams wherein the core and the cladding play a role of a multimodal guiding core, and the sheath plays a role as cladding for the output optical fiber for at least certain spatial modes,
- a plurality of optical receivers configured to receive optical beams from a plurality of optical fibers, upstream of the optical mixer, and
- at least one spatial-mode converter configured to modify a distribution of a radial and angular electromagnetic amplitude of an optical beam, a first of the optical receivers and the optical mixer, and thereby generate the distribution with a maximum amplitude peak in the cladding of the output fiber.

10. The device for injecting a plurality of optical beams as claimed in claim 9, wherein the output optical fiber is a single-mode fiber.

11. The device for injecting a plurality of optical beams as claimed in claim 9, wherein the output optical fiber is a few-mode fiber.

12. The device for injecting a plurality of optical beams as claimed in claim 9, wherein the output optical fiber is a multimode fiber.

* * * * *